United States Patent [19]
Lakshmanan

[11] 3,978,013
[45]* Aug. 31, 1976

[54] ADHESIVE COMPOSITION

[75] Inventor: Pallavoor R. Lakshmanan, Allison Park, Pa.

[73] Assignee: Gulf Research & Development Company, Pittsburgh, Pa.

[ * ] Notice: The portion of the term of this patent subsequent to July 22, 1993, has been disclaimed.

[22] Filed: Dec. 26, 1974

[21] Appl. No.: 536,317

[52] U.S. Cl. .................. 260/27 BB; 260/88 DB; 260/31.2 R; 260/32.8 A; 260/33.6 A
[51] Int. Cl.² ................................. C08L 93/00
[58] Field of Search ............ 260/27 BB, 27 R, 88 D, 260/31.2 R, 32.8 A, 33.4 PQ

[56] References Cited
UNITED STATES PATENTS

| | | | |
|---|---|---|---|
| 3,239,478 | 3/1966 | Harlan | 260/27 R |
| 3,335,430 | 6/1967 | Grasley | 260/27 R |

OTHER PUBLICATIONS

"Rubber Age" Railsback et al., Jan. 1964, pp. 583 to 587.

*Primary Examiner*—Lewis T. Jacobs
*Assistant Examiner*—William E. Parker

[57] ABSTRACT

An adhesive composition consisting essentially of a styrene-butadiene block copolymer, a tackifier, a hydrocarbon solvent and a small amount of water.

6 Claims, No Drawings

ADHESIVE COMPOSITION

Adhesive composition based on styrene-butadiene block copolymers have gained wide use acceptance in recent times because of their favorable processing characteristics, high strength without vulcanization, good creep resistance, good adhesion to a wide variety of substrates and good compatibility with a number of resinous materials. Such adhesive compositions find use as construction adhesives, laminating adhesives, contact cements, wall and tile adhesives, and as caulks and sealants. These compositions are frequently offered as a solvent solution at consistencies commensurate with the application needs. The adhesive solutions, however, have apparently one drawback, namely, that they tend to increase in viscosity on storage over a period of time, and, as such, their usable life becomes somewhat restricted. Adhesives that have increased in viscosity on storage need the addition of a solvent or solvent mixtures in order to reduce their consistency to the desirable application viscosity. This method, however, creates an adhesive of a lower solids level, which is undesirable. In instances such as in construction where the adhesives are packed in special paper tubes, such increased viscosity will result in an adhesive difficult to extrude. This could result in a joint having insufficient bond strength due to inadequate adhesive wetting. Accordingly, it is desirable to have available adhesive compositions that will remain sufficiently fluid over their useful life.

I have found that the viscosity characteristics of an adhesive composition composed of a styrene-butadiene block copolymer, a tackifier and a hydrocarbon solvent upon storage over long periods of time can be improved by incorporating therein a small amount of water.

The styrene-butadiene block copolymer present in the adhesive composition of the present invention has the following general configuration:

A — B — A wherein each terminal A is a styrene polymer block with a glass transition temperature above about room temperature (26°C.) and which is relatively incompatible with elastomeric segment B, defined hereinafter, with the average molecular weight of each A being from about 5,000 to about 125,000, preferably from about 15,000 to about 100,000. B is a butadiene polymer with a glass transition temperature below about room temperature (26°C.) with the average molecular weight of B being from about 15,000 to about 250,000, preferably from about 25,000 to about 150,000. The difference in glass transition temperature between an end block A and a center block B is preferably greater than about 100°C. In the block copolymer used herein, the total of the terminal blocks A will amount to about 20 to about 80 weight per cent, preferably from about 23 to about 50 weight per cent, based on the total weight of the block copolymer.

The tackifier used herein can be any of the resinous substances known in the art for enhancing the tack of adhesive compositions, for example, aromatic hydrocarbon resins, at least one of whose components can be derived from petroleum or coal tar distillates. Particularly suitable are those selected from the group consisting of resins based on coumarone or indene, such as coumarone-indene resins, styrene-indene-isoprene terpolymers, etc. By "coumarone-indene resin" I mean to include fusible, low molecular weight polymers obtained through catalytic and/or thermal polymerization of mixtures containing coumarone and indene, having a melting point (Ring and Ball softening points) of about 38° to about 165°C. In general, the softening point of the tackifier will be between about 38° to about 160°C., preferably between about 70° and 155°C.

The third component required herein is a hydrocarbon solvent or mixtures thereof boiling between about 50° to about 145°C., preferably between about 55° to about 120°C., at atmospheric pressure. Those boiling below the defined range will be released too rapidly from the adhesive composition, causing handling problems, such as insufficient working time, while those boiling above the defined range may require a longer time than normal time for the adhesive to set. Solvents which can be used are aromatics having from six to eight carbon atoms, such as toluene, the xylenes, etc.; aliphatics having from six to eight carbon atoms, such as normal hexane, normal octane, etc., ketones having from two to four carbon atoms, such as methyl ethyl ketone, acetone, etc.; esters having from two to four carbon atoms, such as ethyl acetate, butyl acetate, etc.; etc.

In order to enhance the viscosity characteristics of an adhesive composition containing the above components upon storage, there is also incorporated therein a controlled amount of water.

The adhesive composition of this invention can be prepared in any conventional manner. For example, the ingredients can be added to the solvent in any order, after which mixing can take place until a substantially homogeneous mixture is obtained. Such mixing can be carried out at room temperature and room pressure over a period of about one to about four hours, or, alternatively, all of the ingredients can be mixed and set aside for about 24 hours, during which dissolution of the various adhesive components takes place.

The adhesive composition herein will consist essentially of the following components within the following ranges, assuming the presence of 100 parts by weight of the styrene-butadiene component in the final composition.

| Component | Weight Per Cent | |
|---|---|---|
| | Broad Range | Preferred Range |
| Styrene-Butadiene Block Copolymer | 100 | 100 |
| Tackifier | 10–400 | 20–300 |
| Solvent | 100–5,000 | 500–4,000 |
| Water | 0.05–10 | 0.1–5.0 |

If desired, other components which can impart a desirable characteristic to an adhesive composition but which do not appreciably alter its fundamental nature can also be incorporated in the composition. Thus, a filler, such as a clay or calcium carbonate in an amount of about five to about 40 weight per cent, preferably about 10 to about 30 weight per cent, based on the weight of the final composition, an antioxidant, such as 1,3,5-trimethyl-2,4,6 (3,5-ditertiarybutyl-4-hydroxybenzyl) benzene in an amount of about 0.1 to about five weight per cent, preferably about 0.25 to about 1.5 weight per cent, based on the weight of the final composition, etc., can also be incorporated in the adhesive composition of this invention.

The improved composition of this invention can be further understood by reference to the following:

EXAMPLE I

A solvent solution containing toluene, hexane and acetone in a weight ratio of 1:1:1 was added to Kraton 1101 and Cumar LX509. The mixture was permitted to sit for 24 hours at room temperature and room pressure and then mixed for an additional hour until a homogeneous mixture was obtained. The mixture was held at 26°C. and the viscosity thereof was periodically taken.

EXAMPLE II

The run of Example I was repeated except that a small amount of water was also present in the mixture before the mixture was permitted to stand for 24 hours. The results obtained are tabulated below in Table I.

TABLE I

|  | Ex. I | EX. II |
|---|---|---|
| Kraton 1101, Gms. | 100 | 100 |
| Cumar LX509, Gms. | 100 | 100 |
| Solvent, Gms. | 600 | 600 |
| Water, Gms. | None | 2.0 |
| Solids, Weight Per Cent | 25 | 25 |
| Viscosity, Cps (Brookfield RVF) |  |  |
| No. Three Spindle, 26°C. |  |  |
| One Week | 156 | 144 |
| Four Weeks | 156 | 144 |
| Sixteen Weeks | 137 | 144 |
| Thirty-four weeks | Gel | 226 |
| Thirty-nine weeks | Gel | 208 |

Referring to the components in the adhesive compositions above, Kraton 1101 is a styrene-butadiene block copolymer made and sold by Shell Chemicals wherein the terminal styrene block has a molecular weight of about 5,000 to about 125,000 and the center butadiene block has a molecular weight of about 15,000 to about 250,000, with the styrene block constituting about 30 per cent by weight of the total block. Cumar LX 509 is a coumarone-indene resin made and sold by Neville Chemicals Company having a melting point of 155°C.

The data in Table I illustrates the uniqueness of the adhesive composition defined and claimed herein. In Example I wherein no water was present the adhesive composition had a satisfactory viscosity until the thirty-fourth week, but by the end of the thirty-ninth week it had become a gel. In Example II, wherein a small amount of water was also present, the viscosity at the end of the thirty-fourth week had not increased appreciably over its initial viscosity.

Obviously, many modifications and variations of the invention, as hereinabove set forth, can be made without departing from the spirit and scope thereof and, therefore, only such limitations should be imposed as are indicated in the appended claims.

I claim:

1. An adhesive composition consisting essentially of a styrene-butadiene block copolymer, a coumarone-indene tackifier, a solvent selected from the group consisting of aromatic hydrocarbons having from six to eight carbon numbers, aliphatic hydrocarbons having from six to eight carbon atoms, ketones having from two to four carbon atoms and esters having from two to four carbon atoms, said solvents having a boiling point between about 50° and 145° C. and water wherein the components thereof are present in the following ranges:

| Component | Weight percent |
|---|---|
| Styrene-Butadiene Block Copolymer | 100 |
| Tackifier | 10–400 |
| Solvent | 100–5,000 |
| Water | 0.05–10. |

2. The composition of claim 1 wherein the components are present in the following ranges:

| Component | Weight percent |
|---|---|
| Styrene-Butadiene Block Copolymer | 100 |
| Tackifier | 20–300 |
| Solvent | 500–4,000 |
| Water | 0.1–5.0. |

3. The composition of claim 1 wherein the styrene-butadiene block copolymer has the following general configuration:

$$A - B - A$$

wherein A is a styrene polymer block having an average molecular weight of about 5,000 to about 125,000 and B is a butadiene polymer block having an average molecular weight of about 15,000 to about 250,000.

4. The composition of claim 3 wherein the styrene polymer block has an average molecular weight of about 15,000 to about 100,000 and the butadiene polymer block has an average molecular weight of about 25,000 to about 150,000.

5. The composition of claim 3 wherein the total of the terminal blocks A amount to about 20 to about 80 weight per cent of the block copolymer.

6. The composition of claim 3 wherein the total of the terminal blocks A amount to about 23 to about 50 weight per cent of the block copolymer.

* * * * *